US011300954B2

(12) United States Patent
Goldman-Shenhar (10) Patent No.: US 11,300,954 B2
(45) Date of Patent: Apr. 12, 2022

(54) SYSTEM AND METHODS TO IMPROVE AUTOMATED DRIVING UTILIZATION

(71) Applicant: GM GLOBAL TECHNOLOGY OPERATIONS LLC, Detroit, MI (US)

(72) Inventor: Claudia V. Goldman-Shenhar, Mevasseret Zion (IL)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 221 days.

(21) Appl. No.: 16/546,959

(22) Filed: Aug. 21, 2019

(65) Prior Publication Data
US 2021/0055727 A1 Feb. 25, 2021

(51) Int. Cl.
| | |
|---|---|
| *G05D 1/00* | (2006.01) |
| *B60W 40/02* | (2006.01) |
| *B60W 40/08* | (2012.01) |
| *G05D 1/02* | (2020.01) |
| *G06K 9/62* | (2022.01) |
| *G06N 5/02* | (2006.01) |
| *H04W 4/021* | (2018.01) |

(52) U.S. Cl.
CPC .......... *G05D 1/0061* (2013.01); *B60W 40/02* (2013.01); *B60W 40/08* (2013.01); *G05D 1/0088* (2013.01); *G05D 1/0221* (2013.01); *G06K 9/6218* (2013.01); *G06N 5/022* (2013.01); *H04W 4/021* (2013.01); *G05D 2201/0213* (2013.01)

(58) Field of Classification Search
CPC combination set(s) only.
See application file for complete search history.

(56) References Cited

U.S. PATENT DOCUMENTS

| | | | | |
|---|---|---|---|---|
| 9,283,964 | B2* | 3/2016 | Kim | B60W 30/182 |
| 9,798,323 | B2 | 10/2017 | Tsimhoni et al. | |
| 2014/0358353 | A1* | 12/2014 | Ibanez-Guzman | G05D 1/0027 701/23 |
| 2016/0026180 | A1* | 1/2016 | Tsimhoni | B60W 30/00 701/23 |

(Continued)

*Primary Examiner* — Aniss Chad
*Assistant Examiner* — Christopher George Fees
(74) *Attorney, Agent, or Firm* — Lorenz & Kopf LLP (57) ABSTRACT

A controller is provided to predict potential future engagement or disengagement of an automated driving feature in a vehicle and proactively implement operations to reduce the likelihood of the disengagement or increase the likelihood of the engagement. The controller is configured to: access a model of transfer-of-control events, the transfer-of-control events comprising disengagement and/or engagement transfer-of-control events, the model of transfer-of-control events generated from a crowd-sourced dataset of prior transfer-of-control events and corresponding contexts; identify a transfer-of-control event that has the potential of occurring in the future based on the planned vehicle travel path; determine the likelihood of the identified transfer-of-control event occurring in the future; access, a model of reasons for a transfer-of-control event; identify a potential reason for the identified transfer-of-control event; determine, based on the identified potential reason for transfer-of-control, an action to affect the likelihood of the transfer-of-control event; and cause the action to be implemented.

18 Claims, 4 Drawing Sheets

(56) References Cited

U.S. PATENT DOCUMENTS

2017/0088143 A1* 3/2017 Goldman-Shenhar ...................... B60W 50/08
2017/0285641 A1* 10/2017 Goldman-Shenhar ...................... B60W 50/082

* cited by examiner

SYSTEM AND METHODS TO IMPROVE AUTOMATED DRIVING UTILIZATION

TECHNICAL FIELD

The technology described in this patent document relates generally to automated driving features and more particularly to systems and methods for maximizing use of automated driving features.

There have been many improvements to vehicles regarding the inclusion of automated driving features. Automated driving features may range from cruise control to fully autonomous driving. Automated driving features, however, are not always used when available and safe to be used. Vehicle occupants may benefit from increased usage of automated driving features.

Accordingly, it is desirable to provide systems and methods for improving automated driving utilization. Furthermore, other desirable features and characteristics of the present invention will become apparent from the subsequent detailed description of the invention and the appended claims, taken in conjunction with the accompanying drawings and the background of the invention.

SUMMARY

Systems and methods for improving automated driving utilization are provided. In one embodiment, a controller in a vehicle that is configured to predict potential future engagement or disengagement of an automated driving feature of the vehicle and proactively implement operations to reduce the likelihood of the disengagement or increase the likelihood of the engagement is provided. The controller is configured to: access a model of transfer-of-control events wherein the transfer-of-control events include disengagement transfer-of-control events and/or engagement transfer-of-control events and wherein the model of transfer-of-control events is generated from a crowd-sourced dataset of previous transfer-of-control events and corresponding contexts; identify a transfer-of-control event from the model of transfer-of-control events that has the potential of occurring in the future based on the planned travel path of the vehicle; determine the likelihood of the identified transfer-of-control event occurring in the future; access, when the likelihood of the identified transfer-of-control event occurring is greater than a threshold level, a model of reasons for a transfer-of-control event; identify a potential reason for the identified transfer-of-control event from the model of reasons for a transfer-of-control event; determine, based on the identified potential reason for a transfer-of-control event, an action to affect the likelihood of the transfer-of-control event; and cause the action to occur.

In one embodiment, the contexts include attributes used to characterize the state of a vehicle, its driver, if any, and surroundings at time of a corresponding transfer-of-control event.

In one embodiment, to identify the controller may be configured to identify a geographical location of past occurrences of the transfer-of-control event and the corresponding context.

In one embodiment, to identify a transfer-of-control event that has the potential of occurring in the future the controller may be configured to identify a transfer-of-control event that has the potential of occurring 20 or 30 minutes into the future.

In one embodiment, to determine the likelihood the controller may be configured to determine the likelihood of the identified transfer-of-control event occurring in the future when the vehicle reaches a geographical location associated the identified transfer-of-control event.

In one embodiment, to determine the likelihood the controller may be configured to determine the likelihood based on the ratio of past transfer-of-control events over non transfer-of-control events with contexts that are similar to an expected context when the associated geographical location may be reached.

In one embodiment, the model of reasons for the transfer-of-control event may be generated by clustering past occurrences of the transfer-of-control event based on context.

In one embodiment, the action may be a mitigating action for mitigating the need for an identified disengagement event to occur or an enhancement action for enhancing the likelihood for an identified engagement event to occur.

In one embodiment, to determine an action the controller may be configured to compute a time frame within which action should occur to be effective (e.g., not too early or not too late).

In one embodiment, to cause the action to occur the controller may be configured to: cause the action to automatically occur when in a first operating mode (an automatic mitigation operating mode); cause the action to be announced to a user via an announcement (e.g., via textual or graphical announcement on a display and/or aural announcement via a speaker) when in a second operating mode (e.g., a user announcement operating mode); cause the action to both be announced and to automatically occur when in a third operating mode (e.g., an automatic mitigation with announcement operating mode); and cause the action to both be announced and to automatically occur upon user confirmation when in a fourth operating mode (e.g., a user confirmation operating mode).

In another embodiment, a method for predicting potential future engagement or disengagement of an automated driving feature of the vehicle and proactively implementing operations to reduce the likelihood of the disengagement or increase the likelihood of the engagement is provided. The method includes: accessing a model of transfer-of-control events, the transfer-of-control events including disengagement transfer-of-control events and/or engagement transfer-of-control events, the model of transfer-of-control events generated from a crowd-sourced dataset of previous transfer-of-control events and corresponding contexts; identifying a transfer-of-control event from the model of transfer-of-control events that has the potential of occurring in the future based on the planned travel path of the vehicle; determining the likelihood of the identified transfer-of-control event occurring in the future; accessing, when the likelihood of the identified transfer-of-control event occurring is greater than a threshold level, a model of reasons for a transfer-of-control event; identifying a potential reason for the identified transfer-of-control event from the model of reasons for a transfer-of-control event; determining, based on the identified potential reason for a transfer-of-control event, an action to affect the likelihood of the transfer-of-control event; and causing the action to be implemented.

In one embodiment, accessing a model of transfer-of-control events may include accessing a model of transfer-of-control events from a cloud-based server, and accessing a model of reasons for a transfer-of-control event may include accessing a model of reasons for a transfer-of-control event from a cloud-based server.

In one embodiment, the determining the likelihood may include determining the likelihood of the identified transferof-control event occurring in the future when the vehicle reaches a geographical location associated the identified transfer-of-control event.

In one embodiment, the determining the likelihood may include determining the likelihood based on the ratio of past transfer-of-control events over non transfer-of-control events with contexts that are similar to an expected context when the associated geographical location may be reached.

In one embodiment, the model of reasons for the transfer-of-control event may be generated by clustering past occurrences of the transfer-of-control event based on context.

In one embodiment, the action may be a mitigating action for mitigating the need for an identified disengagement event to occur or an enhancement action for enhancing the likelihood for an identified engagement event to occur.

In one embodiment, the determining may include computing a time frame (e.g., that may be not too early or not too late) within which the action should occur to be effective.

In one embodiment, the causing an action to occur may include: causing the action to automatically occur when in a first operating mode (e.g., an automatic mitigation operating mode); causing the action to be announced to a user via an announcement (e.g., via textual or graphical announcement on a display and/or aural announcement via a speaker) when in a second operating mode (e.g., a user announcement operating mode); causing the action to both be announced and to automatically occur in a third operating mode (e.g., an automatic mitigation with announcement operating mode); and causing the action to both be announced and to automatically occur upon user confirmation in a fourth operating mode (e.g., a user confirmation operating mode).

In one embodiment, the method further includes updating a user model of transfer-of-control based on user reaction to the announcement, the updating including recording (e.g., in the cloud) the announcement, vehicle state (e.g., speed and geo location), action, whether the transfer-of-control event occurred, and reason for transfer-of-control.

In another embodiment, non-transient computer readable media encoded with programming instructions configurable to cause a processor in a vehicle to perform a method is provided. The method includes: accessing a model of transfer-of-control events, the transfer-of-control events including disengagement transfer-of-control events and/or engagement transfer-of-control events, the model of transfer-of-control events generated from a crowd-sourced dataset of previous transfer-of-control events and corresponding contexts; identifying a transfer-of-control event from the model of transfer-of-control events that has the potential of occurring in the future based on the planned travel path of the vehicle; determining the likelihood of the identified transfer-of-control event occurring in the future; accessing, when the likelihood of the identified transfer-of-control event occurring is greater than a threshold level, a model of reasons for a transfer-of-control event; identifying a potential reason for the identified transfer-of-control event from the model of reasons for a transfer-of-control event; determining, based on the identified potential reason for a transfer-of-control event, an action to affect the likelihood of the transfer-of-control event; and causing the action to be implemented.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, summary, or the following detailed description.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, machine learning models, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Apparatus, systems, techniques and articles provided herein can predict when a user of a vehicle may disengage an automated driving feature in the future based on learned models of feature usage and proactively implement operations to reduce the likelihood disengagement. Apparatus, systems, techniques and articles disclosed herein can be configured to automatically change driving control parameters to mitigate/avoid anticipated disengagement. Apparatus, systems, techniques and articles disclosed herein can be configured to suggest changes to driving control parameters to a user and request user confirmation that the suggested changes should be implemented. Apparatus, systems, techniques and articles disclosed herein can also be configured to do both. Apparatus, systems, techniques and articles disclosed herein are configured to predict and interpret the reason for disengagement of an automated driving feature and implement steps to mitigate this behavior when possible. Apparatus, systems, techniques and articles disclosed herein may also be configured to predict when a user of a vehicle may want to engage an automated driving feature in the future based on learned models of feature usage and proactively implement operations to increase the likelihood engagement.

Figure 1:
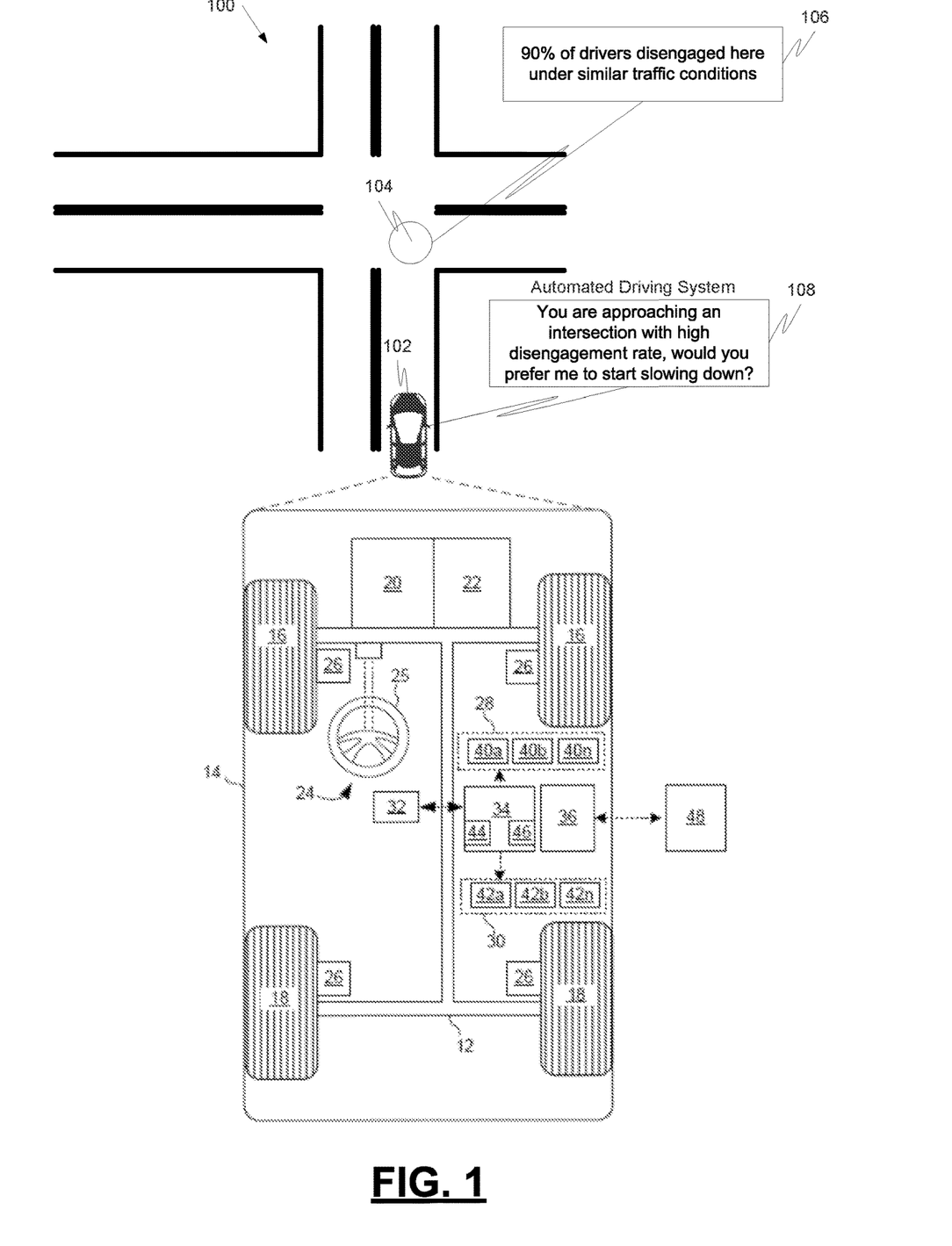
FIG. 1 is a diagram depicting an example operating scenario involving an example vehicle capable of automated and manual operating modes, in accordance with various embodiments.

FIG. 1 is a diagram depicting an example operating scenario 100 involving an example vehicle 102 capable of automated and manual operating modes. In this example, the vehicle 102 is traveling in an autonomous driving mode. The vehicle 102 includes an enhancement controller 103 (that looks ahead at the travel path of the vehicle 102 to determine if conditions exist such that the probability of a transfer-of-control event occurring, such as a disengagement event where an automated driving feature (e.g., autonomous driving) is disengaged or an engagement event where an automated driving feature (e.g., cruise control), is greater than a predetermined threshold level. In this example, the enhancement controller 103 predicts the occurrence of a disengagement transfer-of-control event 104 with a likelihood of occurring that is greater than the predetermined threshold level (e.g., 0.6).

The potential transfer-of-control event may be identified from a dataset of transfer-of-control events experienced in the past by the same vehicle or user and/or other vehicles and users for the road on which the vehicle is or will travel. The dataset may have been generated via crowd sourcing wherein vehicles experiencing transfer-of-control events in the past have reported their transfer-of-control events to one or more servers for data collection. In addition to reporting their transfer-of control events, the vehicles may have also reported the context surrounding the transfer-of-control event. The dataset may be stored, for example, at one or more cloud-based servers or in part onboard the vehicle.

Associated with each transfer-of-control event in the dataset is the context under which the transfer-of-control event occurred. The context may include the geographical location (e.g., GPS coordinates) at which the transfer-of-control event occurred, the speed and acceleration of the vehicle at the time of the transfer-of-control event, whether the vehicle was being driven during the day or night, weather conditions (e.g., rain, snow, sunny, cloudy, etc.), the identity of the driver, the mood of the driver (as determined from physiological sensors and/or wearable devices), the local curvature of the road, the nature of any media being played within the vehicle (e.g., type of music, volume, etc.), whether vehicle had previously been operated on the current road, traffic conditions (e.g., congested, light, etc.), among others.

In this example, the transfer-of-control event 104 occurred under certain traffic conditions. By comparing the current context (e.g., traffic conditions) to the context under which the transfer-of-control event occurred in the past, a reason 106 for the prediction of a transfer-of-control event 104 can be determined. In this example, the reason 106 is that 90% of drivers disengaged at the location under similar traffic conditions.

As a result of the predicted transfer-of-control event 104, the enhancement controller 103 identifies a potential mitigating action that, if successful, could dissuade the user from implementing the predicted transfer-of-control event. In this example, the enhancement controller 103 provides an announcement message 108 to a user (e.g., vehicle occupant) announcing the proposed mitigating action and requesting user confirmation that the vehicle should perform the mitigating action. The announcement may be in the form of a textual or graphical announcement on a vehicle display and/or an aural announcement via a speaker. In this example, the announcement is a textual announcement on a vehicle display that states "You are approaching an intersection with high disengagement rate, would you prefer me to start slowing downs?"

In some embodiments, the enhancement controller 103 may additionally predict when a user of a vehicle may want to engage an automated driving feature in the future based on learned models of feature usage (from the same or other vehicles and/or users) and proactively implement operations to increase the likelihood engagement. The enhancement controller 103 may predict a potential transfer-of-control event in the future based on the planned driving path of the vehicle and identify an enhancement action that, if successful, could persuade the user to implement the predicted transfer-of-control event. For example, the enhancement controller 103 may identify that many users engage cruise control at a certain location under certain driving conditions, predict that the vehicle will reach the location under similar driving conditions, and identify to a user of the vehicle that it may want to engage cruise control at that location.

FIG. 1 also includes a block diagram of the example vehicle 102. As depicted in FIG. 1, the vehicle 102 generally includes a chassis 12, a body 14, front wheels 16, and rear wheels 18. The body 14 is arranged on the chassis 12 and substantially encloses components of the vehicle 200. The body 14 and the chassis 12 may jointly form a frame. The wheels 16-18 are each rotationally coupled to the chassis 12 near a respective corner of the body 14. The vehicle 102 is depicted in the illustrated embodiment as a passenger car, but other vehicle types, including motorcycles, trucks, sport utility vehicles (SUVs), recreational vehicles (RVs), marine vessels, aircraft, etc., may also be used. The vehicle 102 is a vehicle capable of being driven autonomously or semi-autonomously.

The vehicle 102 further includes a propulsion system 20, a transmission system 22, a steering system 24, a brake system 26, a sensor system 28, an actuator system 30, at least one data storage device 32, at least one controller 34, and a communication system 36 that is configured to wirelessly communicate information to and from other entities 48.

The data storage device 32 stores data for use in automatically controlling the vehicle 102. The data storage device 32 may be part of the controller 34, separate from the controller 34, or part of the controller 34 and part of a separate system. The controller 34 includes at least one processor 44 and a computer-readable storage device or media 46. In various embodiments, controller 34 implements an enhancement controller 103 for predicting transfer-of-control events and determining mitigating and/or enhancement actions for mitigating/enhancing the likelihood of the predicted transfer-of-control event occurring. Although only one controller 34 is shown in FIG. 1, embodiments of the vehicle 102 may include any number of controllers 34 that communicate over any suitable communication medium or a combination of communication mediums and that cooperate to process the sensor signals, perform logic, calculations, methods, and/or algorithms, and generate control signals to automatically control features of the vehicle 102.

The controller 34 includes at least one processor and a computer-readable storage device or media encoded with programming instructions for configuring the controller. The processor may be any custom-made or commercially available processor, a central processing unit (CPU), a graphics processing unit (GPU), an application specific integrated circuit (ASIC), a field programmable gate array (FPGA), an auxiliary processor among several processors associated with the controller, a semiconductor-based microprocessor (in the form of a microchip or chip set), any combination thereof, or generally any device for executing instructions.

The computer readable storage device or media may include volatile and non-volatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable programming instructions, used by the controller. The programming instructions may include one or more separate programs, each of which comprises an ordered listing of executable instructions for implementing logical functions.

Figure 2:
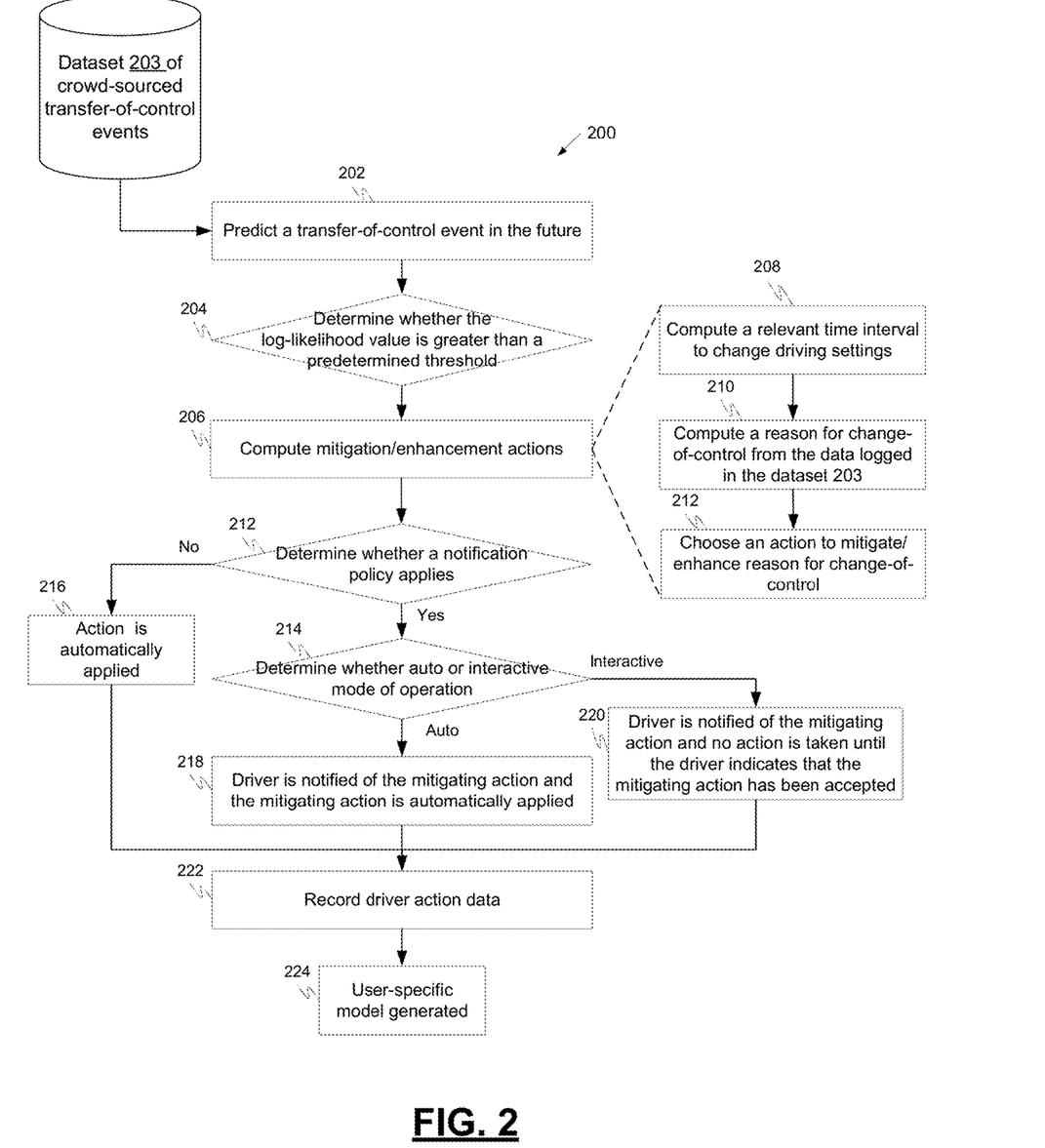
FIG. 2 is a process flow chart depicting an example process in an example enhancement controller, in accordance with various embodiments.

FIG. 2 is a process flow chart depicting an example process 200 in an example enhancement controller (e.g., enhancement controller 103). The order of operation within process 200 is not limited to the sequential execution as illustrated in the FIG. 2 but may be performed in one or more varying orders as applicable and in accordance with the present disclosure.

The example process 200 includes predicting a transfer-of-control event in the future (operation 202). As an example, a transfer-event probability value may be computed based on a dataset 203 of crowd-sourced transfer-of-control events and a predicted future context of the vehicle, and the transfer-of-control criterion may include determining whether the transfer-event probability value (or a value derived from the probability value, such as a likelihood ratio) is greater than a predetermined threshold. More particularly, given a "context" that is characterized by a vector of features $f_i$ (e.g., "raining", "night time", geographical location, etc.), the probability of a transfer as well as the probability of not transferring, given dataset 203 is computed. That is, $\Pr(f_1, \ldots f_n|\text{transfer})$ and $\Pr(f_1, \ldots f_n|\text{not(transfer)})$ is computed using, for example, naive Bayesian analysis, as is known in the art, for a time in the future. The log-likelihood $\rho$ based on those probabilities, e.g., $\rho = \Pr(f_1 \ldots f_n|\text{transfer})/\Pr(f_1, \ldots f_n|\text{not(transfer)})$ is then computed.

As an example, the probability of a transfer-of-control event in the future P(transfer|CurrentState, StateinXminutes=f) may be computed using the following algorithm:

Lets set StateinX minutes = StateX
First compute for X=minTime to MaxTime, all states StateinXminutes =f from CurrentState
    All States = null
    For i=minTime to MaxTime
        if State=f in i minutes then
    //compute new location of Vehicle given its current speed and geo conditions in i minutes
    //Compare State to features in f
        All States += [State,i]
    AllTransferStates=null
    For all s=state in AllStates do
        if P(s|transfer)/P(s|!transfer) > then
            AllTransferStates += [s,s.i]
    Sort AllTransferStates in decreasing order of s.i The dataset 203, in an example case for disengagements may include multiple recorded cases of disengagements for multiple vehicles. Element in this dataset may include date, time, vehicle dynamics, geo location, weather, traffic, lane, and others. The dataset 203 may be kept in the cloud or on a server. The dataset 203 may be stored as a table or as a group of clusters divided by their similarities (e.g., all states with similar traffic and vehicle dynamics parameters). Each time a new data element is added to the log file in the cloud, the data element can be associated to the clusters that the data element to which it is most similar or a determination can be made to determine if a new cluster should be created.

The example process 200 includes determining whether the log-likelihood value p is greater than a predetermined threshold (decision 204). For example, this may be expressed by the following formula:

$$\frac{P(f \mid \text{transfer})}{P(f \mid \neg \text{transfer})} > \left(\frac{A}{1-A}\right) \frac{P(\neg \text{transfer})}{P(\text{transfer})} \equiv \rho$$

The predetermined threshold could be one of any number of predetermined values such as a value of 0.6. The predetermined threshold may vary, depending upon any number of factors.

If the log-likelihood value p is not greater than a predetermined threshold (no at decision 204), then the example process 200 continues with predicting a transfer-of-control event in the future at operation 202. If the log-likelihood value p is greater than a predetermined threshold (yes at decision 204), then the example process 200 includes computing mitigation/enhancement actions (operation 206), such as computing new driving settings and when to apply them.

Computing mitigation/enhancement actions include computing a relevant time interval to change driving settings (operation 208), computing a reason for change-of-control (e.g., disengagement or engagement) from the data logged in the dataset 203 (operation 210), and choosing an action to mitigate/enhance reason for change-of-control (operation 212).

Regarding computing a relevant time interval to change driving settings, taking a mitigation/enhancement action too early or too late may be ineffective. As an example, a relevant time interval to change driving settings may be computed using the following algorithm:

s = first state in AllTransferStates that is not null
For s in AllTransferStates
    set maxImpactTime = s.i with the maximal impact on avoiding disengagement in i minutes from CurrState
    set minImpactTime = s.i with the lowest impact on avoiding disengagement in i minutes from CurrState (there is not enough time to make a change if i < minImpactTime)

```
If mode = automatic, return maxImpactTime ; continue with Method 7 to set values set in
Method 5 calculated based on current state=State at max Impact Time and Disengagement State
is StateX
    Else if mode = interactive then call Method 6 with values set in Method 5 calculated based
on current state = state chosen by policy of timing, disengagement state is StateX.
```

Regarding computing a reason for disengagement from the data logged in the dataset 203, data in the dataset 203 may include all case where many drivers have disengaged in the past including the state of the vehicle dynamics, and environment state (e.g., traffic, weather). The dataset 203 is used to derive one or more reasons for a disengagement action in a state like StateX similar to one experienced in the past under similar conditions. The reason for disengagement from the data logged in the dataset 203 may be determined as follows:

Find closest group (cluster) of states in data (in the dataset 203) similar to StateX, (similar in traffic, weather, geo location). Name this closest group G. Analyze data in G to conclude on possible reasons for disengagement in states in G. This can be implemented by collecting data from drivers (labels) (as explained in U.S. Pat. No. 9,798,323, which is incorporated herein by reference). This can be done with expert data running algorithm or data collected off line. This can be done by deep learning on the data. This can be done by computing the vehicle dynamics reached at StateX and their difference from their normal pattern of driving (to understand that an imminent hard brake could be anticipated)

Regarding choosing an action to mitigate/enhance reason for change-of-control, after determining the reason for the disengagement, an action to mitigate the reason can be determined. As an example, if a hard brake at a certain location is the reason for disengagement, then the mitigating action may be to brake earlier.

After new driver settings and when to apply them are determined, the example process includes determining whether a notification policy applies (decision 212). If a notification policy does not apply (no at decision 212) then the mitigation/enhancement action is applied (operation 216). If a notification policy does apply, then it is determined whether an automatic mode of mitigating/enhancement action application applies or an interactive mode of mitigating/enhancement action application applies (decision 214).

If an automatic mode of operation applies, then the driver is notified of the mitigating action and the mitigating action is automatically applied (operation 218). If an automatic mode of operation does not apply, then the driver is notified of the mitigating action and no action is taken until the driver indicates that the mitigating action has been accepted (operation 220).

The example process 200 also includes recording driver action data (operation 222). The driver's actions—change-of-state or no change-of-state—along with context data are stored (on board the vehicle and/or on a server). The driver action data can be used to generate a user model (224). The user-specific model 224 can be generated to provide more specific information regarding how the specific user would likely respond to the change-of-state event given certain conditions. When a change-of-state event occurs, data regarding the change-of-state event may be recorded in the dataset 203.

Figure 3:
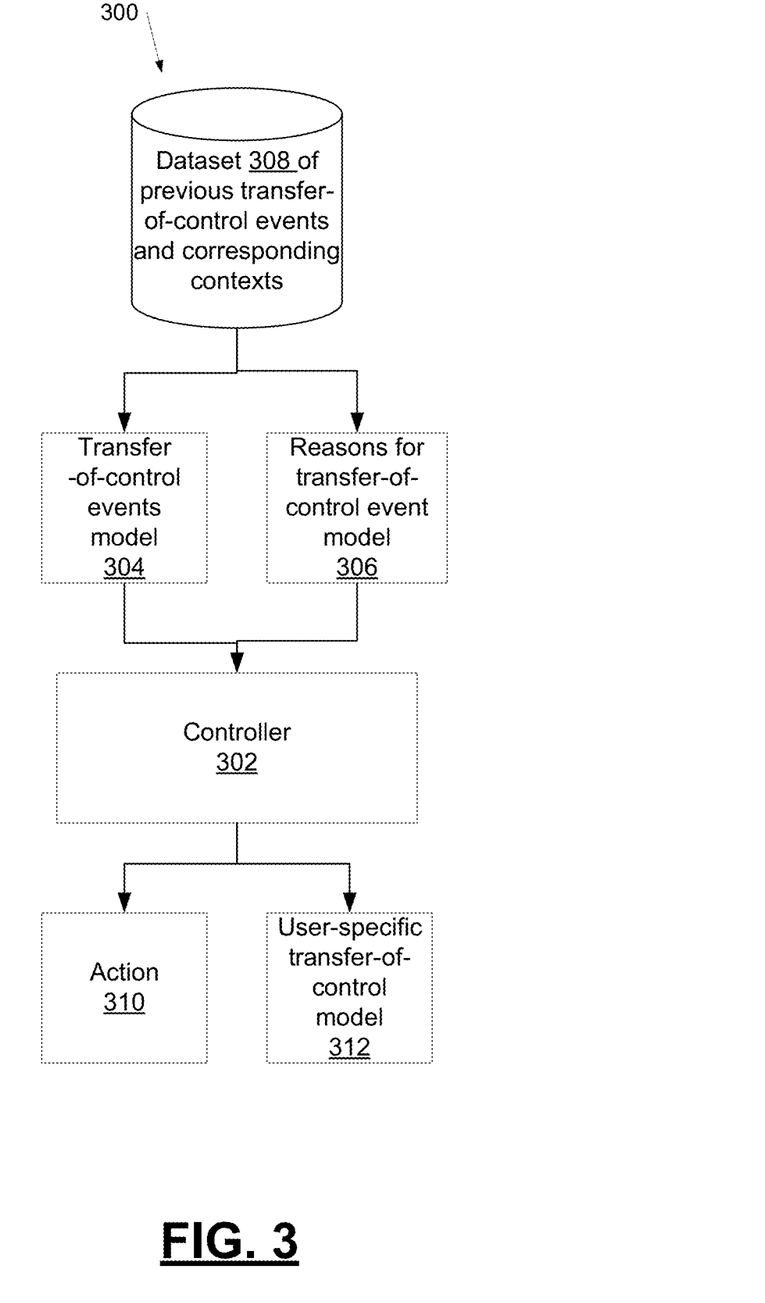
FIG. 3 is a block diagram depicting an example operating environment for an example controller, in accordance with various embodiments.

FIG. 3 is a block diagram depicting an example operating environment 300 for an example controller 302. The example controller 302 is in a vehicle and is configured to predict potential future engagement or disengagement of an automated driving feature of the vehicle and proactively implement operations to reduce the likelihood of the disengagement or increase the likelihood of the engagement. The example controller 302 includes one or more processors and non-transient computer-readable media containing programming instructions. The example controller 302 is configured by the programming instructions on the non-transient computer readable media. The example controller 302 is configured to access a transfer-of-control events model 304 and a reasons for transfer-of-control event model 306. Transfer-of-control events include disengagement transfer-of-control events (where an automated driving mode is disengaged, such as when switching from autonomous driving to manual driving) and/or engagement transfer-of-control events (where an automated driving mode is engaged, such as switching from manual acceleration control to cruise control).

The transfer-of-control events model 304 can be generated from a dataset 308 of previous transfer-of-control events and corresponding contexts. The dataset 308 can be generated from crowd-sourcing techniques wherein, for example, vehicles that experience a transfer-of-control event can transmit data regarding an experienced transfer-of-control event and context data relating to the transfer-of-control event to one or more sites, such as cloud-based server sites, for accumulation and storage.

The contexts includes attributes used to characterize the state of a vehicle, its driver, if any, and/or surroundings at time of a corresponding transfer-of-control event. The contexts may include the geographical location, the speed and acceleration of the vehicle, whether the vehicle may be being driven during the day or night, weather conditions, the identity of the driver, the mood of the driver, the local curvature of the road, the nature of any media being played within the vehicle, whether vehicle had previously been operated on the current road, and/or traffic conditions.

From the dataset 308, a transfer-of-control events model 304 and a reasons for transfer-of-control event model 306 may be generated. A vehicle may locally store some or all of the transfer-of-control events model 304. The controller 302 may retrieve, when needed, the transfer-of-control events model 304 from local storage media in the vehicle or from a cloud-based server.

The example controller is configured to identify a transfer-of-control event from the transfer-of-control events model 304 that has the potential of occurring in the future based on the planned travel path of the vehicle. To identify, the controller may identify a geographical location of past occurrences of the transfer-of-control event and the corresponding context. To identify a transfer-of-control event that has the potential of occurring in the future the controller may be configured to identify a transfer-of-control event that has the potential of occurring during a time frame such as 20 to 30 minutes into the future.

The example controller is configured to determine the likelihood of the identified transfer-of-control event occurring in the future. To determine the likelihood, the controller may determine the likelihood of the identified transfer-of-control event occurring in the future when the vehicle reaches a geographical location associated the identified transfer-of-control event and may determine the likelihood based on the ratio of past transfer-of-control events over non transfer-of-control events with contexts that are similar to an expected context when the associated geographical location is expected to be reached by the vehicle.

The example controller is configured to access, when the likelihood of the identified transfer-of-control event occurring is greater than a threshold level, the reasons for transfer-of-control event model 306 to identify a potential reason for the identified transfer-of-control event. The reasons for transfer-of-control event model 306 may be generated by applying mathematical techniques such as clustering to past occurrences of the transfer-of-control event and their associated context data to identify clusters of past occurrences of the transfer-of-control event along with their associated context data. The associated context data in the clusters may identify one or more reasons for the occurrence of the transfer-of-control event. The reasons for transfer-of-control event model 306 may be accessible via a cloud-based server or stored locally in the vehicle.

The example controller 302 is further configured to determine, based on the identified potential reason for transfer-of-control event, an action 310 (e.g., one or more new driver settings) to affect the likelihood of the transfer-of-control event and cause the action 310 to be implemented. In one example, the action 310 may be a mitigating action to reduce the likelihood of the transfer-of-control event or an enhancement action to improve the likelihood of the transfer-of-control event. The reason for a transfer-of-control event could result, in this example, from a need for hard braking. The action 310 could be a mitigating action such as an action to brake sooner to reduce the likelihood of hard braking later and to reduce the likelihood of a transfer-of-control event such as disengagement of autonomous driving. To determine an action, the controller may also compute a time frame (that is not too early or not too late) within which the action should occur to be effective.

The example controller 302 is configured to cause the mitigating/enhancing action 310 to automatically occur when in a first operating mode (e.g., an automatic mitigation operating mode). The example controller 302 is configured to cause the mitigating/enhancing action to be announced (e.g., via textual or graphical announcement on a display and/or aural announcement via a speaker) to a user when in a second operating mode (e.g., a user announcement operating mode). The example controller 302 is configured to cause the mitigating/enhancing action to both be announced and to automatically occur when in a third operating mode (e.g., an automatic mitigation with announcement operating mode). The example controller 302 is configured to cause the mitigating/enhancing action to both be announced and to automatically occur upon user confirmation when in a fourth operating mode (e.g., a user confirmation operating mode).

The example controller 302 is configured to generate/update a user-specific transfer-of-control model 312 based on user reaction to a notification. The updating may include recording (e.g., at a cloud-based server) the notification, vehicle state (e.g., speed and geographical location), mitigating/enhancement action, whether transfer-of-control event occurred, and reason for transfer-of-control event. When a user-specific transfer-of-control model 312 is available, it can be accessed for use in determining the likelihood of a transfer-of-control event, the reason for a transfer-of-control event and/or action to affect the likelihood of the transfer-of-control event.

Figure 4:
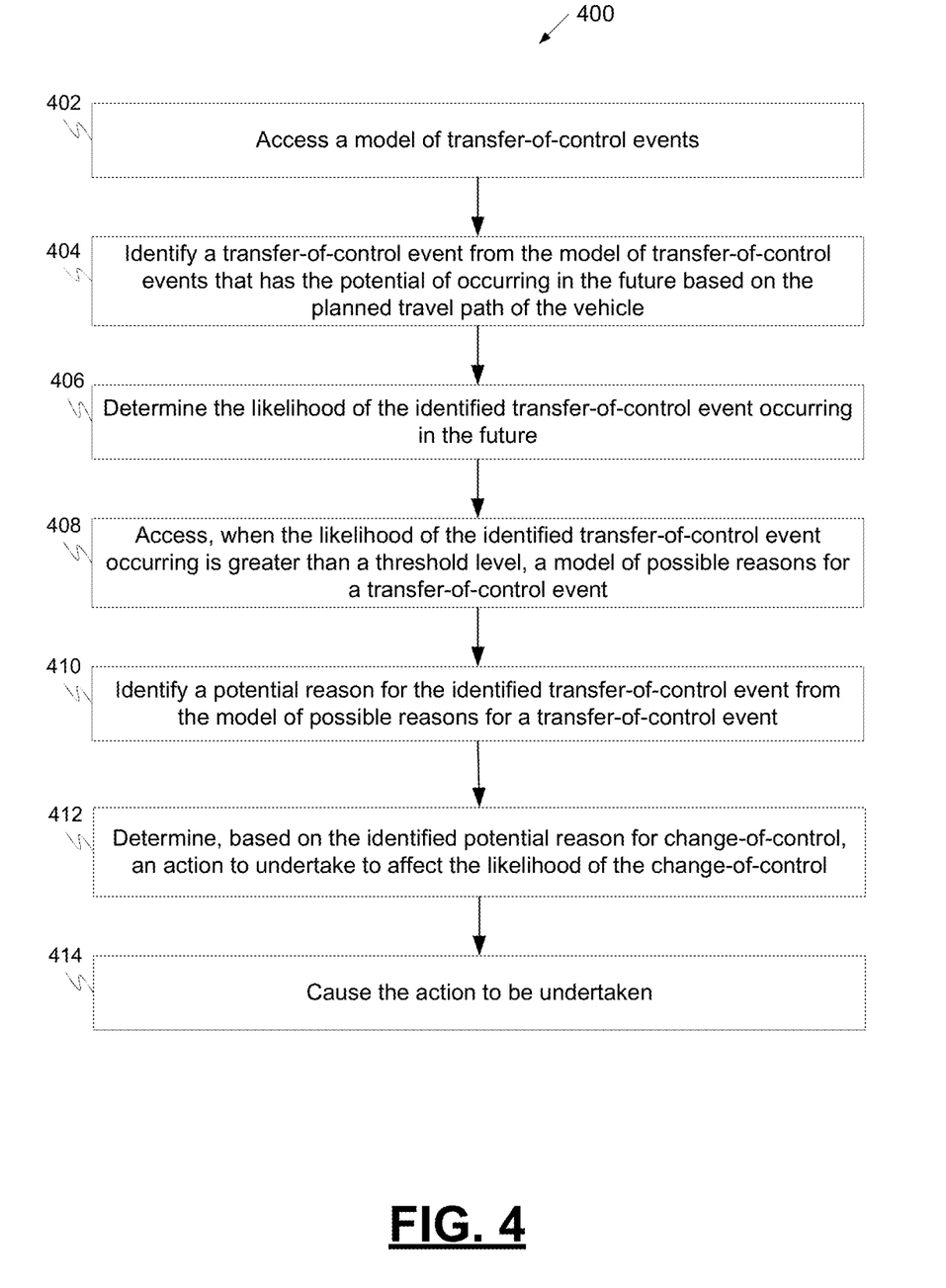
FIG. 4 is a process flow chart depicting an example process in an example controller for predicting potential future engagement or disengagement of an automated driving feature of a vehicle and proactively implementing operations to reduce the likelihood of the disengagement or increase the likelihood of the engagement, in accordance with various embodiments.

FIG. 4 is a process flow chart depicting an example process 400 in an example controller for predicting potential future engagement or disengagement of an automated driving feature of a vehicle and proactively implementing operations to reduce the likelihood of the disengagement or increase the likelihood of the engagement. The order of operation within process 400 is not limited to the sequential execution as illustrated in the figure, but may be performed in one or more varying orders as applicable and in accordance with the present disclosure.

The example process 400 includes accessing a model of transfer-of-control events (operation 402). The transfer-of-control events may include disengagement transfer-of-control events and/or engagement transfer-of-control events. The model of transfer-of-control events may have been generated from a crowd-sourced dataset of previous transfer-of-control events and corresponding contexts.

The contexts includes attributes used to characterize the state of a vehicle, its driver, if any, and/or surroundings at time of a corresponding transfer-of-control event. The contexts may include the geographical location, the speed and acceleration of the vehicle, whether the vehicle may be being driven during the day or night, weather conditions, the identity of the driver, the mood of the driver, the local curvature of the road, the nature of any media being played within the vehicle, whether vehicle had previously been operated on the current road, and/or traffic conditions.

The example process 400 includes identifying a transfer-of-control event from the model of transfer-of-control events that has the potential of occurring in the future based on the planned travel path of the vehicle (operation 404) and determining the likelihood of the identified transfer-of-control event occurring in the future (operation 406). The identifying may include identifying a geographical location of past occurrences of the transfer-of-control event and the corresponding context. The identifying a transfer-of-control event that has the potential of occurring in the future may include identifying a transfer-of-control event that has the potential of occurring during a time frame, such as 20 to 30 minutes into the future.

Determining the likelihood may include determining the likelihood of the identified transfer-of-control event occurring in the future when the vehicle reaches a geographical location associated the identified transfer-of-control event and may include determining the likelihood based on the ratio of past transfer-of-control events over non transfer-of-control events with contexts that are similar to an expected context when the associated geographical location is expected to be reached by the vehicle.

The example process 400 includes accessing, when the likelihood of the identified transfer-of-control event occurring is greater than a threshold level, a model of reasons for a transfer-of-control event (operation 408) and identifying a potential reason for the identified transfer-of-control event from the model of reasons for a transfer-of-control event (operation 410). The model of reasons for transfer-of-control may be generated by applying mathematical techniques such as clustering to past occurrences of the transfer-of-control event and their associated context data to identify clusters of past occurrences of the transfer-of-control event along with their associated context data. The associated context data in the clusters may identify one or more reasons for the occurrence of the transfer-of-control event. The model of reasons for transfer-of-control may be accessible via a cloud-based server or stored locally in the vehicle.

The example process 400 includes determining, based on the identified potential reason for change-of-control, an action to undertake to affect the likelihood of the change-of-control (operation 412) and causing the action to be undertaken (operation 414). The action may be a mitigating action to reduce the likelihood of the transfer-of-control event or an enhancement action to improve the likelihood of the transfer-of-control event. The reason for a transfer-of-control event could result, for example, from a need for hard braking. The action could be a mitigating action such as an action to brake sooner to reduce the likelihood of hard braking later and to reduce the likelihood of a transfer-of-control event such as disengagement of autonomous driving.

The determining may include computing a time frame (e.g., not too early or not too late) within which the action should occur to be effective. The determining may include determining the likelihood of the identified transfer-of-control event occurring in the future when the vehicle reaches a geographical location associated the identified transfer-of-control event. The determining the likelihood may include determining the likelihood based on the ratio of past transfer-of-control events over non transfer-of-control events with contexts that are similar to an expected context when the associated geographical location may be reached.

The mitigating/enhancing action may automatically occur in a first operating mode (e.g., an automatic mitigation operating mode). The mitigating/enhancing action may be announced (e.g., via textual or graphical announcement on a display and/or aural announcement via a speaker) to a user in a second operating mode (e.g., a user announcement operating mode). The mitigating/enhancing action may both be announced and caused to automatically occur in a third operating mode (e.g., an automatic mitigation with announcement operating mode). The mitigating/enhancing action may both be announced and caused to automatically occur upon user confirmation in a fourth operating mode (e.g., a user confirmation operating mode).

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A system in a vehicle that is configured to predict potential future engagement or disengagement of an automated driving feature of the vehicle and proactively implement operations to reduce the likelihood of the disengagement or increase the likelihood of the engagement, the system comprising:
a model of transfer-of-control events generated from a crowd-sourced dataset of previous transfer-of-control events and corresponding contexts, the transfer-of-control events comprising disengagement transfer-of-control events and/or engagement transfer-of-control events;
a model of reasons for a transfer-of-control event generated from the crowd-sourced dataset of previous transfer-of-control events and corresponding contexts, wherein the model of reasons for a transfer-of-control event was generated by applying clustering techniques to past occurrences of the transfer-of-control event and their associated context data to identify clusters of past occurrences of the transfer-of-control event along with their associated context data, wherein the associated context data in the clusters identify one or more reasons for an occurrence of a transfer-of-control event; and
a controller configured to:
access the model of transfer-of-control events;
identify a transfer-of-control event from the model of transfer-of-control events that has the potential of occurring in the future based on the planned travel path of the vehicle;
determine the likelihood of the identified transfer-of-control event occurring in the future based on a predicted future context of the vehicle wherein the future context comprises a vector of features predicted to occur in the future;
access, when the likelihood of the identified transfer-of-control event occurring is greater than a threshold level, the model of reasons for a transfer-of-control event;
identify a potential reason for the identified transfer-of-control event from the model of reasons for a transfer-of-control event based on the associated context data in a cluster of past occurrences of the transfer-of-control event;
determine, based on the identified potential reason for the identified transfer-of-control event, an action to affect the likelihood of the identified transfer-of-control event occurring; and
cause the action to be implemented.

2. The controller of claim 1, wherein the contexts comprise attributes used to characterize the state of a vehicle, its driver, if any, and surroundings at time of a corresponding transfer-of-control event.

3. The controller of claim 1, wherein to identify a transfer-of-control event the controller is configured to identify a geographical location of past occurrences of the transfer-of-control event and the corresponding context.

4. The controller of claim 1, wherein to identify a transfer-of-control event that has the potential of occurring in the future the controller is configured to identify a transfer-of-control event that has the potential of occurring 20 or 30 minutes into the future.

5. The controller of claim 1, wherein to determine the likelihood the controller is configured to determine the likelihood of the identified transfer-of-control event occurring in the future when the vehicle reaches a geographical location associated the identified transfer-of-control event.

6. The controller of claim 5, wherein to determine the likelihood the controller is configured to determine the likelihood based on the ratio of past transfer-of-control events over non transfer-of-control events with contexts that are similar to an expected context when the associated geographical location is reached.

7. The controller of claim 1, wherein the action is a mitigating action for mitigating the need for an identified disengagement event to occur or an enhancement action for enhancing the likelihood for an identified engagement event to occur.

8. The controller of claim 1, wherein to determine an action the controller is configured to compute a time frame within which action should occur to be effective.

9. The controller of claim 1, wherein to cause the action to be implemented the controller is configured to:
  cause the action to automatically occur when in a first operating mode;
  cause the action to be announced to a user via an announcement when in a second operating mode;
  cause the action to both be announced and to automatically occur when in a third operating mode; and
  cause the action to both be announced and to automatically occur upon user confirmation when in a fourth operating mode.

10. A method for predicting potential future engagement or disengagement of an automated driving feature of a vehicle and proactively implementing operations to reduce the likelihood of the disengagement or increase the likelihood of the engagement, the method comprising:
  providing a model of transfer-of-control events generated from a crowd-sourced dataset of previous transfer-of-control events and corresponding contexts, the transfer-of-control events comprising disengagement transfer-of-control events and/or engagement transfer-of-control events;
  providing a model of reasons for a transfer-of-control event generated from the crowd-sourced dataset of previous transfer-of-control events and corresponding contexts, wherein the model of reasons for a transfer-of-control event was generated by applying clustering techniques to past occurrences of the transfer-of-control event and their associated context data to identify clusters of past occurrences of the transfer-of-control event along with their associated context data, wherein the associated context data in the clusters identify one or more reasons for an occurrence of a transfer-of-control event;
  accessing the model of transfer-of-control events;
  identifying a transfer-of-control event from the model of transfer-of-control events that has the potential of occurring in the future based on the planned travel path of the vehicle;
  determining the likelihood of the identified transfer-of-control event occurring in the future based on a predicted future context of the vehicle wherein the future context comprises a vector of features predicted to occur in the future;
  accessing, when the likelihood of the identified transfer-of-control event occurring is greater than a threshold level, the model of reasons for a transfer-of-control event;
  identifying a potential reason for the identified transfer-of-control event from the model of reasons for a transfer-of-control event based on the associated context data in a cluster of past occurrences of the transfer-of-control event;
  determining, based on the identified potential reason for the identified transfer-of-control event, an action to affect the likelihood of the transfer-of-control event occurring; and
  causing the action to be implemented.

11. The method of claim 10, wherein accessing the model of transfer-of-control events comprises accessing a model of transfer-of-control events from a cloud-based server, and accessing the model of reasons for a transfer-of-control event comprises accessing a model of reasons for a transfer-of-control event from a cloud-based server.

12. The method of claim 10, wherein the determining likelihood comprises determining the likelihood of the identified transfer-of-control event occurring in the future when the vehicle reaches a geographical location associated the identified transfer-of-control event.

13. The method of claim 10, wherein the determining the likelihood comprises determining the likelihood based on the ratio of past transfer-of-control events over non transfer-of-control events with contexts that are similar to an expected context when the associated geographical location is reached.

14. The method of claim 10, wherein the action is a mitigating action for mitigating the need for an identified disengagement event to occur or an enhancement action for enhancing the likelihood for an identified engagement event to occur.

15. The method of claim 10, wherein the determining comprises computing a time frame within which the action should occur to be effective.

16. The method of claim 10, wherein the causing an action to be implemented comprises:
  causing the action to automatically occur when in a first operating mode;
  causing the action to be announced to a user via an announcement when in a second operating mode;
  causing the action to both be announced and to automatically occur in a third operating mode; and
  causing the action to both be announced and to automatically occur upon user confirmation in a fourth operating mode.

17. The method of claim 16, further comprising updating a user model of transfer-of-control based on user reaction to the announcement, the updating including recording the announcement, vehicle state, action, whether a transfer-of-control event occurred, and reason for the transfer-of-control event.

18. Non-transitory computer readable media encoded with programming instructions configurable to cause one or more processors in a vehicle to perform a method, the method comprising:
  providing a model of transfer-of-control events generated from a crowd-sourced dataset of previous transfer-of-control events and corresponding contexts, the transfer-of-control events comprising disengagement transfer-of-control events and/or engagement transfer-of-control events;
  providing a model of reasons for a transfer-of-control event generated from the crowd-sourced dataset of previous transfer-of-control events and corresponding contexts, wherein the model of reasons for a transfer-of-control event was generated by applying clustering techniques to past occurrences of the transfer-of-control event and their associated context data to identify clusters of past occurrences of the transfer-of-control event along with their associated context data, wherein the associated context data in the clusters identify one or more reasons for an occurrence of a transfer-of-control event;
  accessing the model of transfer-of-control events;
  identifying a transfer-of-control event from the model of transfer-of-control events that has the potential of occurring in the future based on the planned travel path of the vehicle;
  determining the likelihood of the identified transfer-of-control event occurring in the future based on a predicted future context of the vehicle wherein the future context comprises a vector of features predicted to occur in the future;

accessing, when the likelihood of the identified transfer-of-control event occurring is greater than a threshold level, the model of reasons for a transfer-of-control event;

identifying a potential reason for the identified transfer-of-control event from the model of reasons for a transfer-of-control event based on the associated context data in a cluster of past occurrences of the transfer-of-control event;

determining, based on the identified potential reason for the identified transfer-of-control event, an action to affect the likelihood of the transfer-of-control event occurring; and causing the action to be implemented.

* * * * *